United States Patent
Mochizuki

(10) Patent No.: US 9,942,443 B2
(45) Date of Patent: Apr. 10, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Akiko Mochizuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 75 days.

(21) Appl. No.: 14/845,532

(22) Filed: Sep. 4, 2015

(65) Prior Publication Data

US 2016/0277638 A1   Sep. 22, 2016

(30) Foreign Application Priority Data

Mar. 20, 2015 (JP) .................................. 2015-058631

(51) Int. Cl.
*H04L 29/06* (2006.01)
*H04N 1/44* (2006.01)

(52) U.S. Cl.
CPC ....... *H04N 1/4426* (2013.01); *H04L 63/0245* (2013.01); *H04L 63/105* (2013.01); *H04N 2201/0094* (2013.01)

(58) Field of Classification Search
CPC .......... H04N 1/4426; H04N 2201/0094; H04L 63/105; H04L 63/0245
See application file for complete search history.

(56) References Cited

U.S. PATENT DOCUMENTS

| | | | |
|---|---|---|---|
| 8,041,946 B2 * | 10/2011 | Bunn | H04L 63/0281 713/151 |
| 8,427,665 B2 | 4/2013 | Negishi | |
| 2004/0187022 A1 * | 9/2004 | Asada | H04L 63/105 726/14 |
| 2007/0230750 A1 * | 10/2007 | Ikeda | G06F 17/242 382/123 |

(Continued)

FOREIGN PATENT DOCUMENTS

| | | |
|---|---|---|
| JP | 2010-135979 A | 6/2010 |
| JP | 2010-219757 A | 9/2010 |
| JP | 2011-16284 A | 1/2011 |

OTHER PUBLICATIONS

JP2006-338147.*
JP2007189355.*

*Primary Examiner* — Tri Tran
(74) *Attorney, Agent, or Firm* — Sughrue Mion, PLLC

(57) ABSTRACT

An information processing apparatus includes plural communication interfaces, a specifying unit, a network determining unit, and a transmission controller. The plural communication interfaces are individually connected to plural communication networks having different security levels. The specifying unit specifies a destination terminal to which a file stored in a data memory is to be transmitted. The network determining unit determines a communication network, among the plural communication networks, via which the file is to be transmitted to the destination terminal. The transmission controller prohibits transmission of the file to the destination terminal in a case where a security level set to the file is higher than a security level set to the communication network determined by the network determining unit.

16 Claims, 7 Drawing Sheets

| FILE NAME | SECURITY LEVEL: "L1" | USER TERMINAL INFORMATION | DATE AND TIME OF RECEPTION |
|---|---|---|---|
| P-A001 | 3 | U0001 | 12/11/2014 08:12:12 |
| P-B001 | 1 | U0002 | 12/12/2014 09:18:30 |
| P-A002 | 3 | U0001 | 12/12/2014 14:05:30 |
| ... | ... | ... | ... |

(56) References Cited

U.S. PATENT DOCUMENTS

2010/0031019 A1* 2/2010 Manning .............. H04L 63/105
                                                    713/153
2010/0235883 A1    9/2010 Sato
2014/0304764 A1* 10/2014 Banerjee ............ H04L 63/0245
                                                    726/1

* cited by examiner

| COMMUNICATION NETWORK | SECURITY LEVEL: "L2" |
|---|---|
| FIRST COMMUNICATION NETWORK | 3 |
| SECOND COMMUNICATION NETWORK | 1 |

| TERMINAL NAME | ADDRESS |
|---|---|
| t0001 | aaa.server.net |
| t0002 | bbb.server.net |
| t0003 | ccc.server.net |
| ... | ... |

FIG. 6

| FILE NAME | SECURITY LEVEL: "L1" | USER TERMINAL INFORMATION | DATE AND TIME OF RECEPTION |
|---|---|---|---|
| P-A001 | 3 | U0001 | 12/11/2014 08:12:12 |
| P-B001 | 1 | U0002 | 12/12/2014 09:18:30 |
| P-A002 | 3 | U0001 | 12/12/2014 14:05:30 |
| ... | ... | ... | ... |

FIG. 7

| TERMINAL NAME | ADDRESS | SELECT |
|---|---|---|
| t001 | aaa.server.net | ☐ |
| t002 | bbb.server.net | |
| t003 | ccc.server.net | ☐ |
| ... | ... | ... |

FIG. 8

| TERMINAL NAME | ADDRESS | SELECT |
|---|---|---|
| t001 | aaa.server.net | ☐ |
| t002 | bbb.server.net | ☐ |
| t003 | ccc.server.net | ☐ |
| ... | ... | ... |

FIG. 9

| FILE NAME | SELECT |
|---|---|
| P-A001 | |
| P-B001 | ☐ |
| P-A002 | |
| ... | ... |

FIG. 10

| FILE NAME | SELECT |
|---|---|
| P-A001 | ☐ |
| P-B001 | ☐ |
| P-A002 | ☐ |
| ... | ... |

FIG. 11

| | | COMMUNICATION NETWORK SECURITY LEVEL: "L2" | |
|---|---|---|---|
| | | "3" | "1" |
| FILE SECURITY LEVEL: "L1" | "3" | TRANSMISSION PERMITTED | TRANSMISSION PROHIBITED |
| | "1" | TRANSMISSION PERMITTED | TRANSMISSION PERMITTED |

FIG. 13

| | | COMMUNICATION NETWORK SECURITY LEVEL: "L2" | | |
|---|---|---|---|---|
| | | "3" | "2" | "1" |
| FILE SECURITY LEVEL: "L1" | "3" | TRANSMISSION PERMITTED | TRANSMISSION PROHIBITED | TRANSMISSION PROHIBITED |
| | "2" | TRANSMISSION PERMITTED | TRANSMISSION PERMITTED | TRANSMISSION PROHIBITED |
| | "1" | TRANSMISSION PERMITTED | TRANSMISSION PERMITTED | TRANSMISSION PERMITTED |

FIG. 14

| FILE NAME | SECURITY LEVEL: "L1" | DATE AND TIME OF OBTAINMENT |
|---|---|---|
| S-B101 | 1 | 12/10/2014 09:15:20 |
| S-A101 | 3 | 12/10/2014 16:10:14 |
| S-A102 | 3 | 12/11/2014 11:03:40 |
| ... | ... | ... |

US 9,942,443 B2

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-058631 filed Mar. 20, 2015.

BACKGROUND

Technical Field

The present invention relates to an information processing apparatus, an information processing method, and a non-transitory computer readable medium.

SUMMARY

According to an aspect of the invention, there is provided an information processing apparatus including plural communication interfaces, a specifying unit, a network determining unit, and a transmission controller. The plural communication interfaces are individually connected to plural communication networks having different security levels. The specifying unit specifies a destination terminal to which a file stored in a data memory is to be transmitted. The network determining unit determines a communication network, among the plural communication networks, via which the file is to be transmitted to the destination terminal. The transmission controller prohibits transmission of the file to the destination terminal in a case where a security level set to the file is higher than a security level set to the communication network determined by the network determining unit.

BRIEF DESCRIPTION OF THE DRAWINGS

An Exemplary embodiment of the present invention will be described in detail based on the following figures, wherein:

FIG. 6 is a table showing an example of information on files registered in a data information DB;

FIG. 7 is a diagram illustrating an example of a screen for selecting a destination terminal;

FIG. 8 is a diagram illustrating an example of a screen for selecting a destination terminal;

FIG. 9 is a diagram illustrating an example of a screen for selecting a file;

FIG. 10 is a diagram illustrating an example of a screen for selecting a file;

FIG. 11 is a correspondence table showing an example of relationships between security levels and whether transmission of a file is permitted or prohibited;

FIG. 13 is a correspondence table showing an example of relationships between security levels and whether transmission of a file is permitted or prohibited; and FIG. 14 is a table showing an example of information on files registered in the data information DB.

DETAILED DESCRIPTION

An exemplary embodiment of the present invention will be described below with reference to the drawings. An information processing apparatus according to the exemplary embodiment of the present invention may be a typical computer or an image forming apparatus. Hereinafter, an image forming apparatus will be described as an example.

Figure 1:
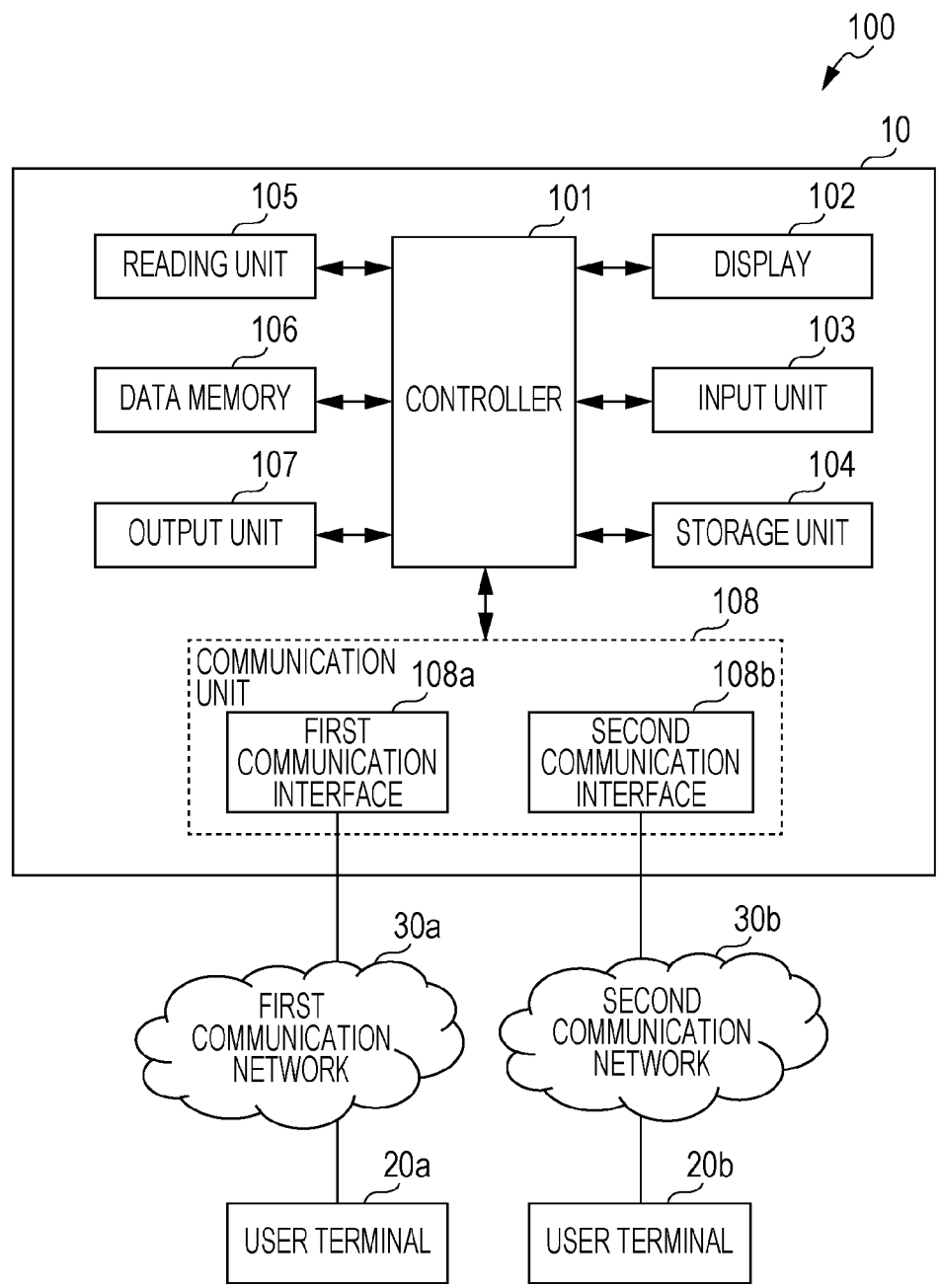
FIG. 1 is a diagram illustrating the overall configuration of an image forming system according to the exemplary embodiment.

FIG. 1 is a diagram illustrating the overall configuration of an image forming system (information processing system) 100 according to the exemplary embodiment. As illustrated in FIG. 1, the image forming system 100 includes an image forming apparatus 10 and user terminals 20a and 20b used by users. The image forming apparatus 10 and the user terminal 20a are connected to each other via a first communication network 30a, and the image forming apparatus 10 and the user terminal 20b are connected to each other via a second communication network 30b. The number of user terminals is not limited. That is, the number of user terminals connected to the first communication network 30a and the number of user terminals connected to the second communication network 30b may be one, or two or more. Here, the two user terminals 20a and 20b that are respectively connected to the first communication network 30a and the second communication network 30b are illustrated for convenience. Hereinafter, the user terminals 20a and 20b will be collectively referred to as user terminals 20 when describing a common function of the user terminals 20a and 20b, and the first and second communication networks 30a and 30b will be collectively referred to as communication networks 30 when describing a common function of the first and second communication networks 30a and 30b.

The first communication network 30a and the second communication network 30b are communication networks independent of each other and are not connected to each other. Here, it is assumed that the first communication network 30a is a communication network having a relatively high security level (secure communication network) and that the second communication network 30b is a communication network having a relatively low security level (insecure communication network). An example of a communication network having a high security level is an intranet, such as an in-house local area network (LAN), and an example of a communication network having a low security level is the Internet. The intranet is a network available to specific users in a local area (within a company or the like), and the Internet is a network available to many unspecific users in the public. The types of communication networks to which the image forming apparatus 10 is connectable are not limited to those described above, and may be three or more types. That is, the image forming apparatus 10 is configured to be able to connect to plural communication networks having different security levels.

Each of the user terminals 20 is a terminal apparatus connected to one of the communication networks 30 and used by a user. The user terminal 20 performs data communication with the image forming apparatus 10 via the communication network 30 in response to a user operation. Accordingly, for example, the user terminal 20 transmits a file of document data or the like (for example, print job data) to the image forming apparatus 10, transmits a print instruction to the image forming apparatus 10, or obtains (receives) image data read by the image forming apparatus 10 (for example, scan data) in response to a user operation. Software such as a browser and an email client is incorporated into the user terminal 20. The user terminal 20 is, for example, an information terminal apparatus such as a personal computer, a personal digital assistant (PDA), or a smartphone. An apparatus connected to the communication network 30 is not limited to the user terminal 20 and may be another image forming apparatus, a server, or the like.

The image forming apparatus 10 has functions of a typical multifunction peripheral, such as a copy function, a scan function, and a facsimile function. The image forming apparatus 10 according to the exemplary embodiment may be an apparatus having at least any one of these functions. These functions are functions according to the related art and thus the description thereof is omitted.

FIG. 1 also illustrates the hardware configuration of the image forming apparatus 10. The image forming apparatus 10 includes a controller 101, a display 102, an input unit 103, a storage unit 104, a reading unit 105, a data memory 106, an output unit 107, and a communication unit 108. The image forming apparatus 10 may also include an operation unit, a power switch, and so forth. The controller 101 includes a central processing unit (CPU). The controller 101 executes various arithmetic processing operations and controls the individual units of the image forming apparatus 10 on the basis of a program stored in the storage unit 104. The details of the controller 101 will be described below.

The display 102 is constituted by a display device such as a liquid crystal display, and displays, for example, a result of information processing performed by the controller 101. The input unit 103 is constituted by input devices such as a touch panel and a button key, and receives input of an operation from a user. The input unit 103 may be displayed on the display 102 as an electronic input device. The input unit 103 functions as a user interface (UI). The storage unit 104 is constituted by an information recording medium such as read only memory (ROM), a random access memory (RAM), or a hard disk, which stores a program executed by the controller 101. The storage unit 104 also operates as a working memory of the controller 101. Various types of memories are applicable to the storage unit 104. For example, a storage device such as a semiconductor memory may be used as the storage unit 104. A program and various data that are stored in the storage unit 104 in the exemplary embodiment may be obtained from an external apparatus via the communication unit 108 or may be obtained from an external storage medium. The storage unit 104 may be provided outside the image forming apparatus 10 and may be connected to the image forming apparatus 10 via a network.

The reading unit 105 is constituted by a scanner or the like. The reading unit 105 optically scans an object such as a paper medium, and thereby reads information on the object as image information (image data).

The data memory 106 stores, in the form of a file, document data or image data input (transmitted) from the outside (the user terminal 20) to the image forming apparatus 10 via the communication network 30, electronic data of an image (image data) read by the reading unit 105, and so forth. That is, the data memory 106 stores print job data, scan data, and so forth in the form of a file. The data memory 106 is constituted by an information recording medium such as a ROM, a RAM, or a hard disk, like the storage unit 104. The data memory 106 may be included in the storage unit 104 or may be provided outside the image forming apparatus 10 and may be connected to the image forming apparatus 10 via a network. For example, the data memory 106 may be constituted by a data server connected to a network via the communication unit 108.

The output unit 107 is constituted by a printing unit or the like for forming an image on a medium such as a sheet. For example, when a user performs a print instruction operation, the output unit 107 prints (outputs) image data or the like on a paper medium in accordance with processing performed by the controller 101.

The communication unit 108 includes plural communication interfaces corresponding to plural communication networks and performs data communication with the plural user terminals 20. For example, the communication unit 108 includes a first communication interface 108a and a second communication interface 108b. The first communication interface 108a is connected to the first communication network 30a (for example, an intranet), and the second communication interface 108b is connected to the second communication network 30b (for example, the Internet). Each communication interface is constituted by, for example, a network interface card (NIC). FIG. 1 illustrates an example in which the communication unit 108 includes the two communication interfaces 108a and 108b, but the number of communication interfaces included in the communication unit 108 corresponds to the number of communication networks and may be three or more instead of two.

Figure 2:
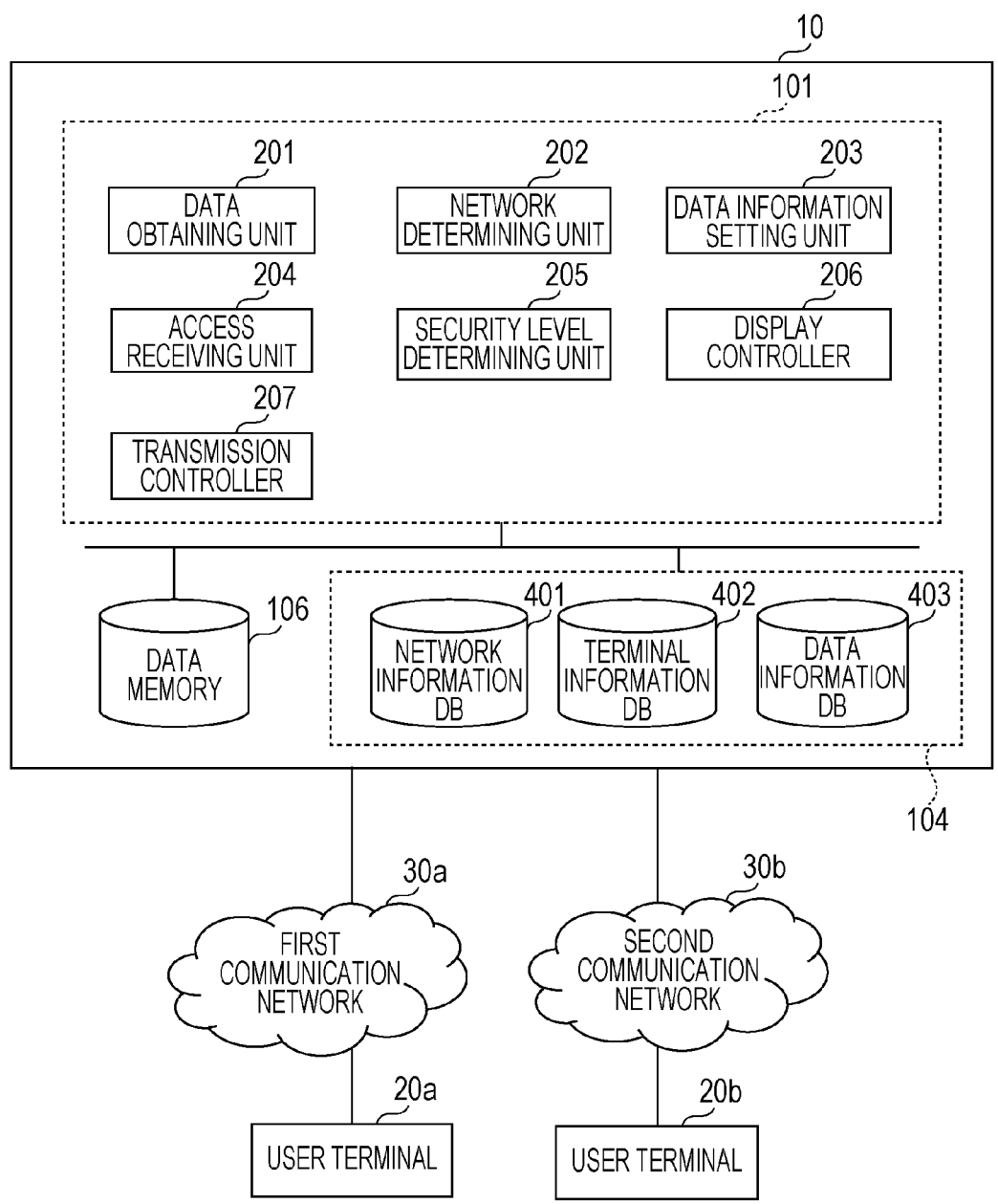
FIG. 2 is a functional block diagram of an image forming apparatus according to the exemplary embodiment.

FIG. 2 is a functional block diagram of the image forming apparatus 10. As illustrated in FIG. 2, the controller 101 functionally includes a data obtaining unit 201, a network determining unit 202, a data information setting unit 203, an access receiving unit 204, a security level determining unit 205, a display controller 206, and a transmission controller 207. These functions are implemented when a program stored in the storage unit 104 is executed by the controller 101.

Figures 3, 4, 5:
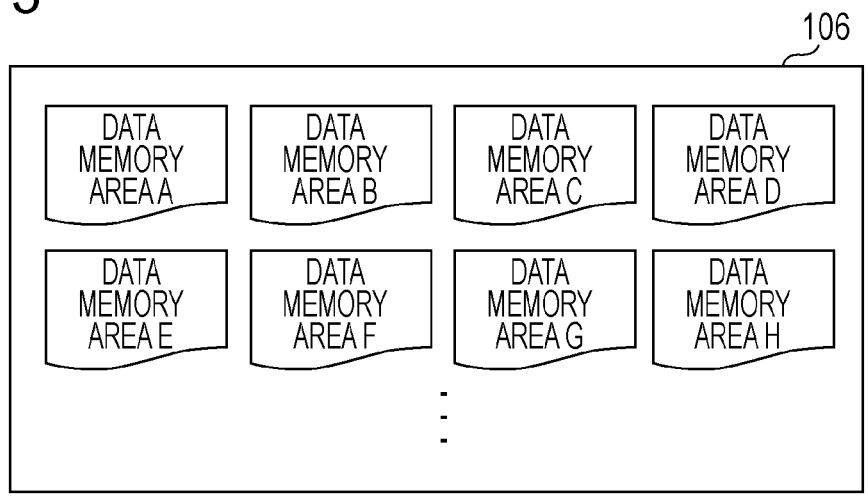
FIG. 3 is a table showing an example of information registered in a network information DB.
FIG. 4 is a table showing an example of information registered in a terminal information DB.
FIG. 5 is a schematic diagram illustrating the configuration of a data memory.

The storage unit 104 includes a network information database (network information DB) 401. Security levels that are set for individual communication networks are registered in the network information DB 401. For example, as illustrated in FIG. 3, a security level "3" is set to the first communication network 30a having a high security level, and a security level "1" is set to the second communication network 30b having a low security level. These security levels are registered in the network information DB 401. The security level of a communication network is preset by, for example, a manager of the image forming apparatus 10. The storage unit 104 also includes a terminal information database (terminal information DB) 402. As illustrated in FIG. 4, information on the user terminals 20 connected to the image forming apparatus 10 via networks (terminal names, addresses, and so forth) are registered in the terminal information DB 402.

The data obtaining unit 201 obtains data transmitted (input) from the user terminal 20 to the image forming apparatus 10 via the communication network 30 (for example, print job data) and data of an image read by the reading unit 105 (for example, scan data). Also, the data obtaining unit 201 stores the obtained data in the data memory 106 in the form of a file.

The data memory 106 may include plural data memory areas (folders). FIG. 5 is a schematic diagram illustrating an example configuration of the data memory 106. Each data memory area is configured to be able to store plural files. Each data memory area may be associated with one or plural user terminals 20. Further, for example, a data memory area A may store data received from the user terminal 20, and a data memory area B may store data read by the reading unit 105.

When the data obtaining unit 201 receives data transmitted from the user terminal 20, the network determining unit 202 determines (specifies) the communication network via which the data has been transmitted. For example, the network determining unit 202 determines, on the basis of identifiers (interface identifiers) assigned to individual communication interfaces, which of the first communication network 30a and the second communication network 30b has been used to input the data to the data memory 106. The type of communication network may be determined by using the following method according to the related art.

For example, if the network determining unit 202 performs a connection test (for example, a connection test using Ping) to determine whether or not a communication interface is able to connect to a specific destination on the Internet and if the connection test succeeds, the network determining unit 202 determines that the type of the communication network connected to the communication interface is the Internet. If the network determining unit 202 performs a connection test to determine whether or not a communication interface is able to connect to a specific destination on an intranet and if the connection test succeeds, the network determining unit 202 determines that the type of the communication network connected to the communication interface is an intranet. The network determining unit 202 may determine the type of the communication network connected to a communication interface on the basis of an IP address assigned to the communication interface. The IP address may be assigned by a DHCP server (not illustrated) connected via a communication network (the Internet or an intranet).

The data information setting unit 203 registers various information on the data obtained by the data obtaining unit 201 in a data information DB 403.

For example, when the data obtaining unit 201 receives data from the user terminal 20 via the communication network 30, the data information setting unit 203 registers the file name and security level of the data (a file), information on the user terminal 20 as a transmitter, and various information including the date and time of reception in the data information DB 403 in association with the data (the file) that is stored in the data memory 106. The security level of the file is set on the basis of the security levels of communication networks registered in the network information DB 401 (see FIG. 3). Specifically, the security level of the file is set in accordance with the type of the communication network via which the data of the file has been transmitted and with a determination result generated by the network determining unit 202. For example, in a case where the data of the file is input from the user terminal 20a to the image forming apparatus 10 via the first communication network 30a having a high security level (here, an intranet), the data information setting unit 203 sets a high security level "3" to the file. For example, in a case where the data of the file is input from the user terminal 20b to the image forming apparatus 10 via the second communication network 30b having a low security level (here, the Internet), the data information setting unit 203 sets a low security level "1" to the file. FIG. 6 illustrates an example of information on files (received data) registered in the data information DB 403.

The access receiving unit 204 receives, from the user terminal 20 or the input unit 103 (UI) of the image forming apparatus 10, an access to a file stored in the data memory 106 or an access to terminal information (information on the user terminal 20) registered in the terminal information DB 402. Specifically, for example, when a user A accesses (for example, selects) a file (with a file name "P-A001") stored in the data memory 106 to transmit the file to a certain user terminal 20, the access receiving unit 204 receives the access. When the user A accesses terminal information registered in the image forming apparatus 10 (for example, selects an address "ccc.server.net" of the user terminal "t0003") to transmit a file stored in the data memory 106 to a certain user terminal 20, the access receiving unit 204 receives the access. The access receiving unit 204 functions as a specifying unit that specifies a destination terminal to which a file stored in the data memory 106 is to be transmitted.

The security level determining unit 205 determines whether the security level set to a file that is stored in the data memory 106 and is to be transmitted (see FIG. 6) is higher than the security level of the communication network that is to be used to transmit the file to the destination terminal, that is, the user terminal 20 (see FIG. 3). Specifically, in a case where the security level set to the file is "L1" and the security level set to the communication network is "L2", the security level determining unit 205 determines whether or not L1>L2 is satisfied.

Here, the network determining unit 202 determines the type of the communication network to be used for transmission to the destination terminal. For example, the network determining unit 202 determines the type of the communication network on the basis of the information on the file registered in the data information DB 403 (see FIG. 6). The information on files illustrated in FIG. 6 may include identification information on the communication networks via which data has been input to the data memory 106.

The display controller 206 controls the content of an image displayed on the user terminal 20 and the display 102 of the image forming apparatus 10 on the basis of an access received by the access receiving unit 204 and a determination result generated by the security level determining unit 205. Hereinafter, an example of content that is displayed in accordance with an access will be described.

For example, in a case where a user selects a file stored in the data memory 106, the display controller 206 controls display so that the user terminal 20 connected to a communication network that satisfies "L1>L2" among the plural user terminals 20 is not selectable and that the user terminal 20 connected to a communication network that does not satisfy "L1>L2" is selectable. For example, FIG. 7 illustrates a screen for selecting a destination terminal in a case where the user terminals 20 with terminal names "t0001" and "t0003" are connected to the first communication network 30a and the user terminal 20 with a terminal name "t0002" is connected to the second communication network 30b and in a case where a user selects a file (with a file name "P-A001") to which a high security level (L1="3") is set. In this case, the user terminal 20 with the terminal name "t0002" is connected to the second communication network 30b having a security level (L2="1") that is lower than the security level "3" of the selected file ("P-A001"), that is, L1>L2 is satisfied, and thus display is controlled so that the user terminal 20 ("t0002") is not selectable as a destination terminal. FIG. 8 illustrates a screen for selecting a destination terminal in a case where a user selects a file (with a file name "P-B001") to which a low security level (L1="1") is set. In this case, the user terminals 20 with the terminal names "t0001", "t0002", and "t0003" are connected to communication networks having a security level (L2="1", "3") that is equal to or higher than the security level "1" of the selected file ("P-B001"), and thus display is controlled so that these user terminals 20 are selectable as a destination terminal. The display controller 206 may display only the user terminals 20 that are selectable as a destination terminal.

For example, in a case where a user selects terminal information (information on the user terminal 20) registered in the terminal information DB 402 (see FIG. 4) when the user transmits a file, the display controller 206 controls display so that a file that satisfies "L1>L2" is not selectable among plural files stored in the data memory 106 (see FIG. 6) and that a file that does not satisfy "L1>L2" is selectable. FIG. 9 illustrates a screen for selecting a file in a case where the user terminals 20 with terminal names "t0001" and "t0003" are connected to the first communication network 30a and the user terminal 20 with the terminal name "t0002" is connected to the second communication network 30b and in a case where a user first selects an address "bbb-.server.net" of the user terminal 20 with the terminal name "t0002" as a destination terminal to which a file is to be transmitted. In this case, the user terminal 20 with the terminal name "t0002" is connected to the second communication network 30b having a low security level (L2="1"), and thus display is controlled so that the files "P-A001" and "P-A002" that satisfy "L1>L2" are not selectable. FIG. 10 illustrates a screen for selecting a file in a case where a user first selects an address "ccc.server.net" of the user terminal 20 with the terminal name "t0003" as a destination terminal to which a file is to be transmitted. In this case, the user terminal 20 with the terminal name "t0003" is connected to the first communication network 30a having a high security level (L2=3), and thus display is controlled so that files "P-A001", "P-B001", and "P-A002" that do not satisfy "L1>L2" (that satisfy "L1≤L2") are selectable. The display controller 206 may display only files that are selectable as files to be transmitted.

In a case where an unselectable destination terminal or file exists, the display controller 206 may display a message (warning) indicating the existence on the user terminal 20 or the display 102 of the image forming apparatus 10. In a case where an unselectable destination terminal or file exists, the display controller 206 may display a message prompting the user to change the destination terminal or a message prompting the user to change the target file to be transmitted on the user terminal 20 or the display 102 of the image forming apparatus 10.

The above-described processing performed by the display controller 206 may be omitted. That is, the display controller 206 may cause the user terminal 20 or the display 102 to display information on all the destination terminals and target files to be transmitted.

The transmission controller 207 executes or prohibits transmission of a file on the basis of a determination result generated by the security level determining unit 205. That is, the security level determining unit 205 performs the determination processing on the basis of the security level of the file selected by a user as a target to be transmitted and the security level of the communication network connected to the destination terminal selected by the user, and the transmission controller 207 executes or prohibits transmission of the file on the basis of the determination result. Specifically, the transmission controller 207 prohibits transmission of the file in a case where the security level "L1" of the file to be transmitted is higher than the security level "L2" of the communication network that is to be used for transmitting the file (L1>L2), and executes transmission of the file in a case where "L1" is equal to or lower than "L2" ("L1≤L2"). FIG. 11 is a correspondence table showing an example of relationships between "L1" and "L2" and whether transmission is permitted or prohibited. As illustrated in FIG. 11, transmission of a file having a high security level to an external apparatus via a communication network having a low security level is prohibited.

Figure 12:
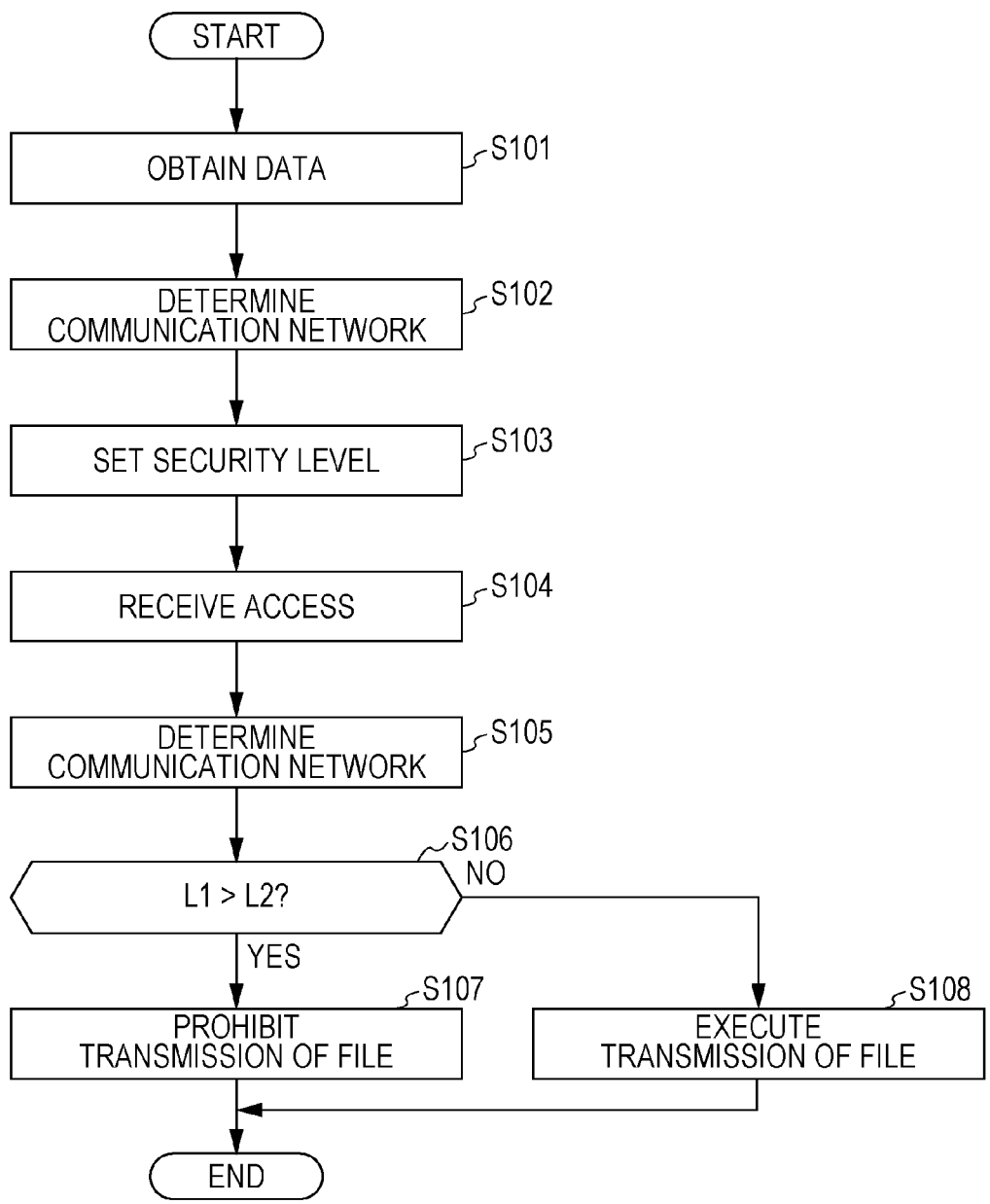
FIG. 12 is an operation flow diagram of the image forming apparatus according to the exemplary embodiment.

FIG. 12 is an operation flow diagram of the image forming apparatus 10. In the description given below, a description of the processing performed by the display controller 206 is omitted.

First, the data obtaining unit 201 obtains data (a file) transmitted from the user terminal 20 to the image forming apparatus 10 (S101). The data obtaining unit 201 stores the obtained data in the data memory 106. Subsequently, the network determining unit 202 determines the communication network via which the data has been transmitted (S102). Here, the network determining unit 202 determines whether the communication network is the first communication network 30a or the second communication network 30b.

Subsequently, the data information setting unit 203 sets the security level of the data on the basis of the determination result generated by the network determining unit 202 (S103). For example, in a case where the data has been transmitted via the first communication network 30a, the data information setting unit 203 sets a security level "3" to the file of the data. For example, in a case where the data has been transmitted via the second communication network 30b, the data information setting unit 203 sets a security level "1" to the file of the data.

Subsequently, the access receiving unit 204 receives an access to a file stored in the data memory 106 (selection of a file) and an access to a destination terminal to which the file is to be transmitted (selection of a destination terminal) (S104). Accordingly, the access receiving unit 204 specifies the target file to be transmitted and the destination terminal to which the file is to be transmitted.

Subsequently, the network determining unit 202 determines whether the communication network that is to be used to transmit the file to the destination terminal is the first communication network 30a or the second communication network 30b (S105).

Subsequently, the security level determining unit 205 determines whether the security level (L1) set to the target file that is stored in the data memory 106 and is to be transmitted is higher than the security level (L2) of the communication network determined by the network determining unit 202 (S106).

In a case where the security level L1 of the file is higher than the security level L2 of the communication network (L1>L2), the transmission controller 207 prohibits transmission of the file (S107). On the other hand, in a case where the security level L1 of the file is equal to or lower than the security level L2 of the communication network (L1≤L2), the transmission controller 207 executes transmission of the file (S108).

The image forming apparatus 10 controls transmission of a file stored in the data memory 106 to the outside by performing the above-described processing.

In the above-described configuration, the security level of a file is set by the data information setting unit 203 on the basis of the security level of the communication network 30, but the configuration is not limited thereto. For example, a user who creates and transmits a file may manually set the security level of the file. The security level of the file may be set in accordance with a memory area in which the file is stored. For example, in the data memory areas illustrated in FIG. 5, a security level "3" may be set to the files stored in the data memory areas A and B, and a security level "1" may be set to the files stored in the data memory areas C and D.

In the above-described configuration, the security levels of a file and a communication network are set in two stages ("3" and "1"), but the configuration is not limited thereto. For example, both the security levels may be set in three stages of high, middle, and low ("3", "2", and "1"). In this case, the communication networks connected to the image forming apparatus 10 may be, for example, a communication network establishing an in-house LAN (security level "3"), a communication network establishing communication between sites or offices (security level "2"), and a communication network establishing the Internet (security level "1"). In this case, the security level of a file is set in accordance with the security levels of the three communication networks. FIG. 13 is a correspondence table showing an example of relationships between the security level "L1" of a file and the security level "L2" of a communication network and whether transmission of a file is permitted or prohibited in a case where both the security levels are set in three stages. As illustrated in FIG. 13, in a case where the security level "L1" of the target file to be transmitted is higher than the security level "L2" of the communication network to be used to transmit the file (L1>L2), transmission of the file is prohibited. In a case where "L1" is equal to or lower than "L2" (L1≤L2), transmission of the file is executed.

In the above-described configuration, data (a file) stored in the data memory 106 is transmitted (input) from an external apparatus (a user terminal) via any of the communication networks 30, but the data is not limited thereto. For example, data (a file) stored in the data memory 106 may be scan data of an image read by the reading unit 105 (hereinafter referred to as data). Hereinafter, a description will be given of a case where the data is scan data. For the same configuration as that described above, a description is omitted.

The data obtaining unit 201 obtains data of an image read by the reading unit 105 and stores the obtained data in the data memory 106 in the form of a file.

The data information setting unit 203 registers various information on the data obtained by the data obtaining unit 201 in the data information DB 403. For example, after the data obtaining unit 201 obtains the data of the image read by the reading unit 105, the data information setting unit 203 registers information on the data (a file), such as a file name, security level, and date and time of obtainment, in the data information DB 403 in association with the data (the file) stored in the data memory 106. The security level of a file is set on the basis of the security level set to target sheet to be read (object). For example, the security level of data obtained by reading an object is set on the basis of information that is applied to the object by using an electronic watermark or the like. More specifically, for example, in a case where the object is a printout of an image of data input from the user terminal 20a to the image forming apparatus 10 via the first communication network 30a, information of an electronic watermark representing a high security level (for example, "3") is applied to the object. In a case where the reading unit 105 reads the object having information of the electronic watermark representing the high security level, the data information setting unit 203 sets a high security level ("3") to the read data. For example, in a case where the object is a printout of an image of data input from the user terminal 20b to the image forming apparatus 10 via the second communication network 30b, information of an electronic watermark representing a low security level (for example, "1") is applied to the object. In a case where the reading unit 105 reads the object having information of the electronic watermark representing the low security level, the data information setting unit 203 sets a low security level ("1") to the read data. FIG. 14 illustrates an example of information on files (scan data) registered in the data information DB 403.

The security level of a file may be set on the basis of an analysis result obtained by analyzing the content of an object (for example, a keyword in a document). For example, in a case where a predetermined keyword is included in a target document, the data information setting unit 203 sets a high security level (for example, "3") to the read data. In the case of a file that is created by using a document creation application program, a keyword may be extracted by analyzing data included in the file, or a keyword may be extracted by analyzing image data obtained by optically scanning a paper medium to read information on the paper medium by using an optical character recognition (OCR) technique. Alternatively, the security level of a file may be manually set by a user in the input unit 103 (UI) when an object is read.

The configuration of controlling transmission of scan data stored in the data memory 106 to the outside is the same as the above-described configuration.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a plurality of communication interfaces that are configured to be individually connected to a plurality of communication networks having different security levels; and
  at least one hardware processor configured to implement:
    specifying a destination terminal to which a file stored in a data memory is to be transmitted;
    determining a communication network, among the plurality of communication networks, via which the file is to be transmitted to the destination terminal; and
    prohibiting transmission of the file to the destination terminal in a case where a security level set to the file is higher than a security level set to the communication network, wherein
    setting the security level to the file by determining a type of network which transmitted the file to the information processing apparatus, and
    in response to receiving the file at the information processing apparatus, the security level set to the file is set to a security level of a network which transmitted the file to the information processing apparatus.

2. The information processing apparatus according to claim 1, wherein the at least one hardware processor is further configured to execute transmission of the file to the destination terminal in a case where the security level set to the file is equal to or lower than the security level set to the communication network.

3. The information processing apparatus according to claim 1, wherein the security level set to the file is set in accordance with a security level set to the network, among the plurality of communication networks, via which the file has been input to the data memory.

4. The information processing apparatus according to claim 3, wherein a first security level set to the file that is input to the data memory via a first communication network among the plurality of communication networks is higher than a second security level set to the file in a case in which the file is input to the data memory via a second communication network among the plurality of communication networks, the second communication network having a security level lower than a security level of the first communication network.

5. The information processing apparatus according to claim 1, wherein
the data memory is further configured to store the file in a case in which the file has been input from an external terminal via one of the plurality of communication networks, and
the security level is set to the file in accordance with a security level set to the communication network via which the file has been input to the data memory.

6. The information processing apparatus according to claim 1, wherein the at least one hardware processor is further configured to implement:
optically scanning a paper medium and reading information on the paper medium, wherein
the data memory stores a file corresponding to the information, and
a security level that is applied to the paper medium in advance is set to the file.

7. The information processing apparatus according to claim 6, wherein
information of an electronic watermark corresponding to a security level is applied to the paper medium, and
the security level of the file is set in accordance with the information of the electronic watermark that is obtained through reading of the paper medium.

8. The information processing apparatus according to claim 1, wherein the at least one hardware processor is further configured to implement:
optically scanning a paper medium and reading information on the paper medium, wherein
the data memory stores a file corresponding to image data, and
a security level is set to the file in accordance with a keyword that is extracted through document analysis on the image data.

9. The information processing apparatus according to claim 1, wherein the at least one hardware processor is further configured to implement:
controlling a display to display information on terminals connected to the information processing apparatus via networks; and
in a case where the security level set to the file is higher than the security level set to the communication network, controlling the display so that the destination terminal is unselectable from a list of information on the terminals.

10. The information processing apparatus according to claim 1, wherein, the at least one hardware processor is further configured to determine a type of the communication network in response to receiving a request to transmit the file over the communication network, and
the network determining unit further determines the security level of the communication network by determining the type of the communication network.

11. The information processing apparatus according to claim 10, wherein the at least one hardware processor is further configured to determine the type of the network and the type of the communication network as any of a local area network (LAN), an intranet and an internet.

12. The information processing apparatus according to claim 11, wherein the at least one hardware processor is further configured to set the security level to the file to a first security level, higher than a second security level, in response to determining that the type of network is any of the LAN and the intranet, and
the at least one hardware processor is further configured to set the security level to the file to the second security level in response to determining that the type of network is the internet.

13. The information processing apparatus according to claim 12, wherein the at least one hardware processor is further configured to determine the security level of the communication network to be the first security level, higher than a second security level, in response to determining that the communication network is any of the LAN and the intranet, and
the at least one hardware processor is further configured to determine the security level of the communication network to be the second security level in response to determining that the communication network is the internet.

14. The information processing apparatus according to claim 1, further comprising:
a communication interface configured to receive the file from the network, wherein
the at least one hardware processor is further configured to determine the type of network which transmitted the file to the information processing apparatus by performing a connection test through the communication interface that received the file from the network.

15. An information processing method for an information processing apparatus including a plurality of communication interfaces that are individually connected to a plurality of communication networks having different security levels, the information processing method comprising:
specifying a destination terminal to which a file stored in a data memory is to be transmitted;
determining a communication network, among the plurality of communication networks, via which the file is to be transmitted to the destination terminal;
prohibiting transmission of the file to the destination terminal in a case where a security level set to the file is higher than a security level set to the determined communication network; and
setting the security level to the file by determining a type of network which transmitted the file to the information processing apparatus,
wherein, in response to receiving the file at the information processing apparatus, the security level set to the file is set to a security level of a network which transmitted the file to the information processing apparatus.

16. A non-transitory computer readable medium storing a program causing a computer to execute a process, the computer including a plurality of communication interfaces that are individually connected to a plurality of communication networks having different security levels, the process comprising:

specifying a destination terminal to which a file stored in a data memory is to be transmitted;

determining a communication network, among the plurality of communication networks, via which the file is to be transmitted to the destination terminal;

prohibiting transmission of the file to the destination terminal in a case where a security level set to the file is higher than a security level set to the determined communication network; and setting the security level to the file by determining a type of network which transmitted the file to the information processing apparatus, wherein, in response to receiving the file at the information processing apparatus, the security level set to the file is set to a security level of a network which transmitted the file to the information processing apparatus.

* * * * *